United States Patent
Wang et al.

(10) Patent No.: US 6,983,335 B2
(45) Date of Patent: Jan. 3, 2006

(54) DISK DRIVE MANAGING METHOD FOR MULTIPLE DISK-ARRAY SYSTEM

(75) Inventors: Jerry Wang, Taipei (TW); Wilson Hu, Taipei (TW)

(73) Assignee: Via Technologies, Inc., Taipei (TW)

( * ) Notice: Subject to any disclaimer, the term of this patent is extended or adjusted under 35 U.S.C. 154(b) by 192 days.

(21) Appl. No.: 10/626,651

(22) Filed: Jul. 25, 2003

(65) Prior Publication Data

US 2004/0153618 A1    Aug. 5, 2004

(30) Foreign Application Priority Data

Dec. 12, 2002  (TW) ................................ 91135914 A

(51) Int. Cl.
   *G06F 12/00*    (2006.01)
(52) U.S. Cl. ................ 710/10; 710/74; 710/8; 711/114; 714/770; 714/6; 714/7
(58) Field of Classification Search ............ 710/8, 710/10, 62, 72, 74; 711/114, 110, 154.17; 714/5–7, 770

See application file for complete search history.

(56) References Cited

U.S. PATENT DOCUMENTS

| | | | | |
|---|---|---|---|---|
| 5,950,230 A | * | 9/1999 | Islam et al. ................. | 711/156 |
| 6,742,081 B2 | * | 5/2004 | Talagala et al. ............ | 711/114 |
| 6,799,284 B1 | * | 9/2004 | Patel et al. .................... | 714/6 |

\* cited by examiner

*Primary Examiner*—Kim Huynh
(74) *Attorney, Agent, or Firm*—Rosenberg, Klein & Lee

(57) ABSTRACT

A disk drive managing method manages disk drive in multiple disk-array system containing at least one disk-array. Each array has at least one disk drive with an array configuration. The array configuration comprises an array signature and serial check sum of each disk drive in the array. The method comprises steps of: detecting each disk drive in the system; reading an array configuration from the detected disk drive; validating the array signature of the disk drive being corrective or not; reading the serial check sum of other disk drive from the same array; recognizing the disk-array being recorded or not; and recording from the disk drive. The method can be used to manage single disk-array system, multiple disk-array system or span array system.

20 Claims, 4 Drawing Sheets

DISK DRIVE MANAGING METHOD FOR MULTIPLE DISK-ARRAY SYSTEM

BACKGROUND OF THE INVENTION

1. Field of the Invention

The present invention relates to a disk drive managing method for managing disk drive in disk-array, more particularly to a disk drive managing method for multiple disk-array system, wherein the array signature of disk drive and serial check sum of each disk drive in the same array are examined to identify disk-array and ensure array integrity.

2. Description of Related Art

The rapid market growth of information products has urged the development of new technologies and new specifications in information industry. As to data storage device, the data transfer rate and data safety are important issues. Therefore, RAID (redundant array of independent disk drive) is proposed to meet above demands. RAID 0 (Redundant Arrays of Inexpensive Disks level 0) array provides the function of data striping to boost the data access speed. RAID 1 array provides the function of data mirroring to ensure security and safety of data storage and system stability. In addition, RAID 0+1 array, a combination of RAID 0 array plus RAID 1 array, has advantages in both data transfer speed and data security.

FIG. 1 shows a schematic view of a disk-array 14 connected to a computer 12. The disk-array 14 mainly comprises a disk-array controller 141, a plurality of disk drives including a first disk drive 161, a second disk drive 162, a third disk drive 165 and a fourth disk drive 167, connected to the computer 12 through the disk-array controller 141. Similarly, the computer 12 accesses the plurality of disk drives through the disk-array controller 141.

In prior art disk array, each disk drive has a sector arrangement as shown in FIG. 2. The first sector of each driver is configured as an array configuration sector 221 for the disk drive in which the configuration of the disk-array is stored. The sector next to the array configuration sector 221 is configured as MBR (master boot record) sector 223. The remaining sectors are configured into a plurality of data sectors begun from a first data sector 225 and ended by a last data sector 229.

The disk-array architecture and sector arrangement described above are only feasible for single disk-array system and are problematic for multiple disk-array system (a system with multiple disk-arrays). The placement of array configuration sector in first sector of the disk drive precludes the possibility for stand-alone use. Once being removed from the disk-array, the data in the disk drive cannot be accessed.

SUMMARY OF THE INVENTION

It is an object of the invention to provide a disk drive managing method for multiple disk-array system to provide more flexible use for disk drive of the system.

In one aspect of the invention, the disk drive in disk-array/span array can be efficiently identified by array signature.

In one aspect of the invention, the disk drive in disk-array and the array integrity can be efficiently identified by serial check sum of each disk drive.

In another aspect of the invention, an array configuration is stored in last sector of each disk drive in a disk-array to prevent data crash.

In still another aspect of the invention, a new array can be added when the serial check sum of the disk drive thereof is not recorded by the system.

To achieve above object and aspect, the present invention provides a disk drive managing method for managing disk drive in multiple disk-array system containing at least one disk-array. Each array has at least one disk drive with an array configuration, wherein the array configuration comprises an array signature and serial check sum of each disk drive in the array. The method comprises the steps of detecting each disk drive in the system; reading an array configuration from the detected disk drive; validating the array signature of the disk drive being corrective or not; reading the serial check sum of other disk drive from the same array; recognizing the disk-array being recorded or not; and recording from the disk drive.

To achieve above object and aspect, the present invention provides a disk drive managing method for managing disk drive in multiple disk-array system containing at least one disk-array. Each array has at least one disk drive, each disk drive having an array signature and a serial check sum stored at the last sector thereof. The method comprises the steps of detecting each disk drive from the system; reading the last sector from the detected disk drive; validating the array signature of the disk drive being corrective or not; reading the serial check sum of other disk drive from the same array; recognizing the disk-array being recorded or not; and recording from the disk drive.

The various objects and advantages of the present invention will be more readily understood from the following detailed description when read in conjunction with the appended drawing, in which:

DETAILED DESCRIPTION OF THE INVENTION

Figure 1:
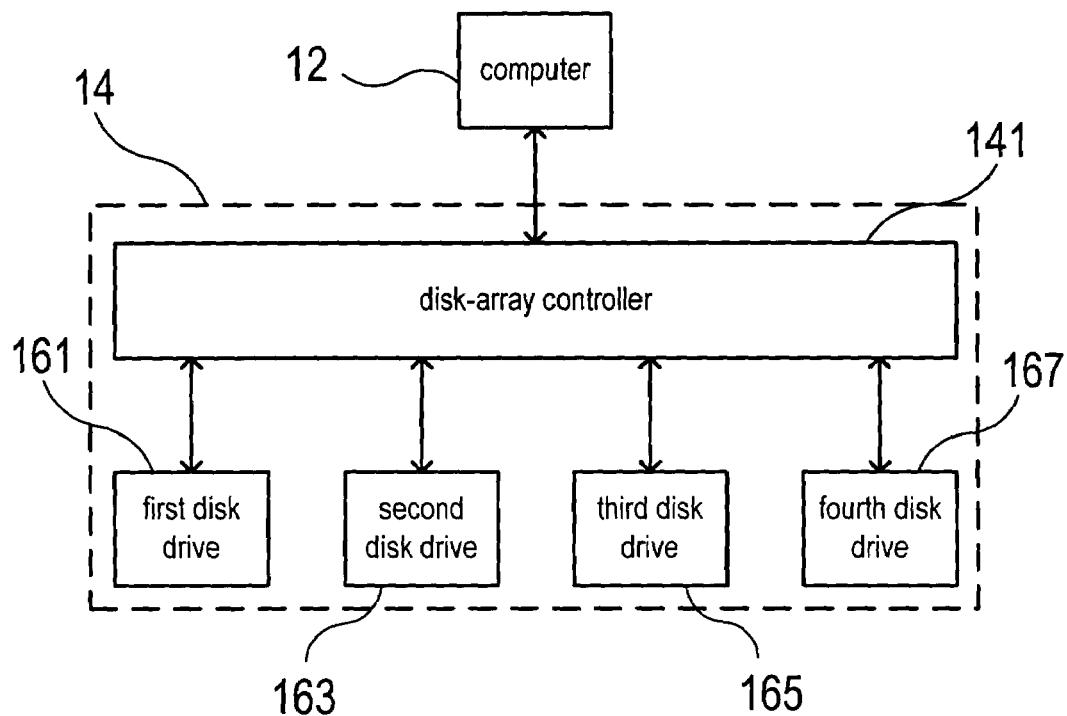
FIG. 1 shows a schematic view of prior art disk-array.
Figure 2:
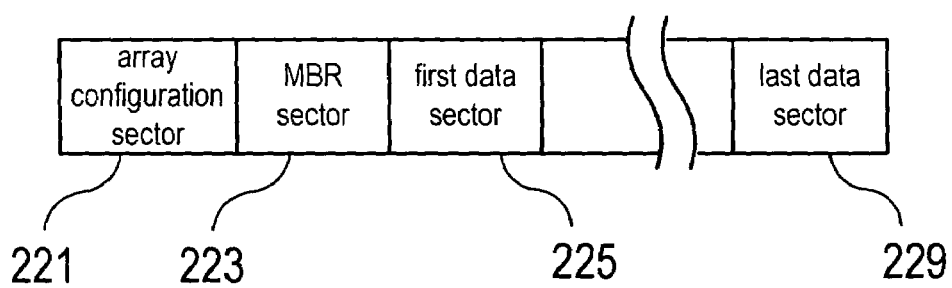
FIG. 2 shows the sector arrangement of prior art disk-array.
Figure 3:
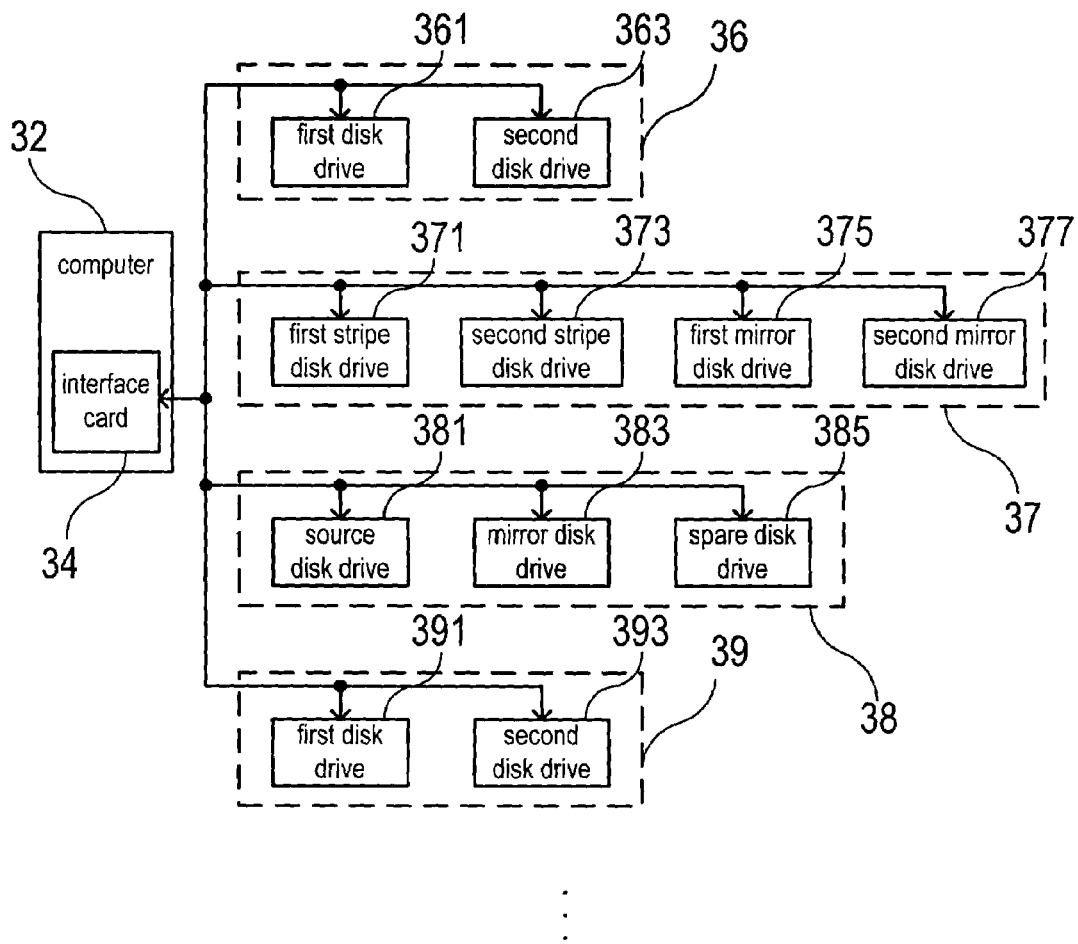
FIG. 3 shows a schematic block diagram of a multiple disk-array system.
Figure 4:
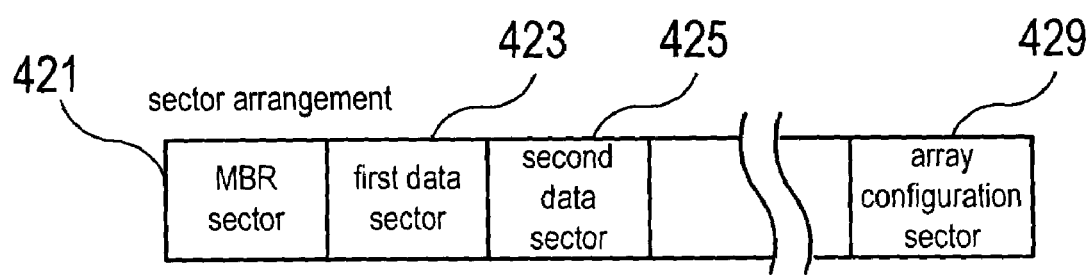
FIG. 4 shows the sector arrangement for each disk drive in the multiple disk-arrays system.

FIG. 3 shows a schematic block diagram of a multiple disk-array system used to explain the disk drive managing apparatus for multiple disk-array system according to the present invention. FIG. 4 shows the sector arrangement for each disk drive in the multiple disk-arrays system according to the present invention. In this system, a computer 32 is connected to a plurality of disk-arrays and a plurality of independent disk drive drives in a span array through an interface card 34. The plurality of disk-arrays includes a first disk-array 36, a second disk-array 37, and a third disk-array 38. To access data from the disk drives of the disk-arrays or the span array, the computer firstly finds an accessing address of the data in corresponding disk drive, and then accesses the disk drives of the disk-arrays or the span array through the adaptor card 34.

The plurality of disk-arrays can be disk-arrays of the same category or disk-arrays of different categories. The first disk-array 36 is a RAID 0 array which includes a first stripe disk drive 361 and a second stripe disk drive 363. The second disk-array 37 is a RAID 0+1 array, which comprises a first stripe disk drive 371, a second stripe disk drive 373, a first mirror disk drive 375, and a second mirror disk drive 377. The third disk-array 18 is a RAID 1 array, which comprises a source disk drive 381, a mirror disk drive 383, and a spare disk drive 385. The disk drives in the span array include a first disk drive 391 and a second disk drive 393.

FIG. 4 shows the sector arrangement for each disk drive in the multiple disk-arrays system according to the present invention. In sector arrangement of disk drive in prior disk-array system, the first sector is configured as the array configuration sector. In the present invention, the first sector is configured as the MBR sector, and following sectors are first data sector 423, second data sector 425, etc. In the present invention, the last sector for each disk drive in the disk-array is array configuration sector 429 and used for storing array configuration.

When a data is to be written in to a disk drive, the sectors at front portion of the disk drive are firstly accessed. Therefore, the last sector has the minimal possibility to access. When the array configuration is stored in the last sector of a disk drive in a disk-array such as RADD 1 array, the disk drive can be removed and used as independent disk drive. A disk drive already stored with data can also be safely added to a disk-array such as RADD 1 array. The original data stored in the disk drive added to the disk-array will not be ruined. Therefore, the arrangement of the array configuration in the last sector of a disk drive renders the disk drive with flexible usage.

The method of the present invention can be applied to the multiple disk-array system shown in FIG. 3. The disk drive in each array of the multiple disk-array system has an array configuration, which comprises at least an array signature and a plurality of serial check sums of every disk drive in the same disk-array. The array signature is stored with a specific value (such as AA55h) to identify a disk drive in a disk-array. The serial check sum of each disk drive is obtained according to a numeration on the model number, serial number, and firmware revision number of the disk drive. The serial check sum of each disk drive is arranged in a sequence according to the sequence of disk drive in the disk-array.

The serial check sum of each disk drive is nearly different to each other and can be used to identify the disk drive in a disk-array.

Figure 5:
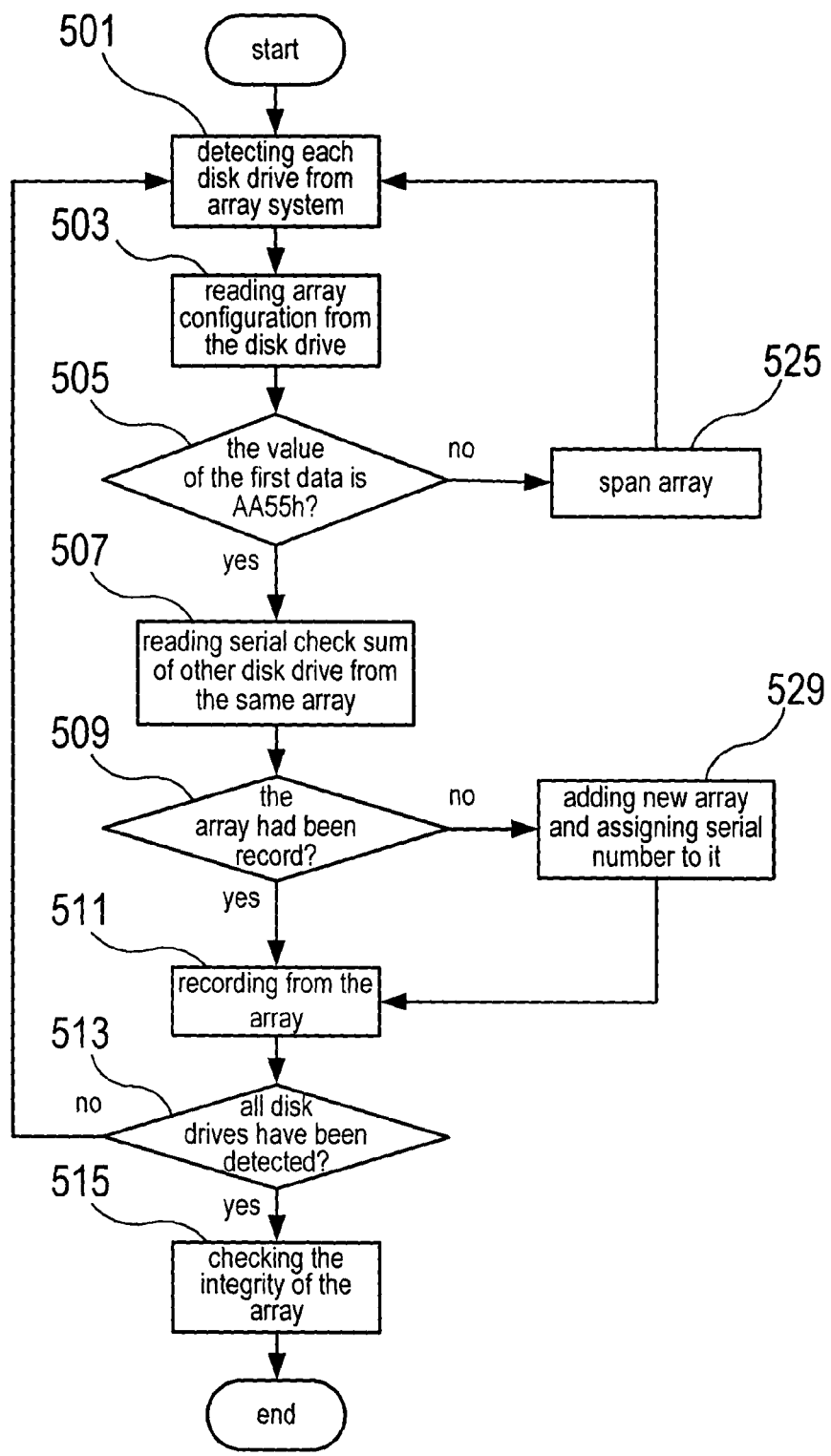
FIG. 5 shows a flowchart according to a preferred embodiment of the present invention.

FIG. 5 shows the flowchart of the disk drive managing method according to a preferred embodiment of the present invention. In a first step 501, a computer detects each disk drive in a disk-array. In a following step 503, the computer reads an array configuration from a detected disk drive. In a following step 505, the compute examines whether a first data (the array signature) in the array configuration from a detected disk drive is AA55h. If false, the detected disk drive can be determined to be an independent disk drive and not contained in any disk-array in step 625. Afterward, the process goes back to the step 501 for detecting another disk drive. If true, the process proceeds to a step 507, wherein the disk drive belongs to a specific disk-array and the serial check sums of other disk drives in the array are read. In a following step 509, the serial check sums of other disk drives in the array are examined to check whether the disk-array had been recorded. If the disk-array had been recorded, the disk drive is recorded in a following step 511, else the disk-array is a new array and a step 529 is executed. In the step 529, the new array is recorded and assigned with an array serial number and then the process goes to the step 511 to record and manage the disk drive thereof.

After the step 511, the computer examines whether all disk drives have been detected in a step 513. If false, the process goes back to the step 501 to detect another disk drive. If true, the serial check sum of the detected disk drive is compared with the serial check sums of other disk drive in the array to check the integrity of the array in a step 515.

To sum up, the disk drive managing method for multiple disk-array system according to the present invention can be advantageously used to manage the multiple disk-array system. The array signature of disk drive and serial check sum of each disk drive in the same array are examined to identify disk-array and ensure array integrity.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A disk drive managing method for managing disk drive in multiple disk-array system, said method comprising the steps of:

providing an interface operable to access a plurality of disk-arrays coupled thereto, where data is distributed across each disk-array of said plurality of disk-arrays independently of said distribution across other disk-arrays of said plurality of disk-arrays;

reading an array configuration from a disk drive coupled to a corresponding disk-array coupled to said interface, said array configuration including an array signature and a plurality of serial check sums, each of said plurality of serial check sums corresponding to a disk drive belonging to said corresponding disk-array;

validating said array signature of said disk drive;

reading said plurality of serial check sums of another disk drive coupled to said corresponding disk-array;

determining if said disk-array corresponding to said plurality of serial check sums read in said serial check sums reading step is recorded as one of said plurality of disk-arrays coupled to said interface; and recording said serial check sum corresponding to said disk drive in said plurality of serial check sums of said corresponding disk-array.

2. The disk drive managing method as in claim 1, wherein said array signature is a predetermined value.

3. The disk drive managing method as in claim 2, wherein said disk drive is an independent disk drive in a span array if said array signature could not be validated in said array signature validating step, said span array being coupled to said interface.

4. The disk drive managing method as in claim 1, wherein said serial check sum of said corresponding disk drive is arranged in said plurality of serial check sums according to a location of said disk drive in said corresponding disk-array.

5. The disk drive managing method as in claim 4, wherein said serial checksum of said corresponding disk drive is obtained by a numeration on a model number, a serial number, and a firmware revision number of said disk drive.

6. The disk drive managing method as in claim 1, wherein each of said plurality of disk-arrays is identified by said plurality of serial check sums.

7. The disk drive managing method as in claim 1, further comprising a step of adding a record for a new disk-array when said corresponding disk-array is not recorded as one of said plurality of disk-arrays as determined in said disk-array recorded determining step.

8. The disk drive managing method as in claim 7, further comprising a step of assigning a serial number to said new disk-array.

9. The disk drive managing method as in claim 1, further comprising steps of:
  determining whether all disk drives in said plurality of disk-arrays have been detected; and
  recording integrity properties for each disk-array in said plurality of disk-arrays.

10. The disk drive managing method as in claim 9, further including the step of determining from said integrity property whether all disk drives recorded in said plurality of serial check sums of each disk drive of said corresponding disk-array have been detected and recorded.

11. The disk drive managing method as in claim 9, wherein said array configuration is stored at a last sector of each disk drive.

12. A disk drive managing method for managing disk drive in multiple disk-array system containing at least one disk-array, said method comprising the steps of:
  providing an interface operable to access a plurality of disk-arrays coupled thereto, where data is distributed across each disk-array of said plurality of disk-arrays independently of said distribution across other disk-arrays of said plurality of disk-arrays;
  reading a last sector from a disk drive coupled to a corresponding disk-array coupled to said interface, said last sector having stored therein an array configuration including an array signature and a plurality of serial check sums, each of said plurality of serial check sums corresponding to a disk drive belonging to said corresponding disk-array;
  validating said array signature of said disk drive;
  reading said plurality of serial check sums of another disk drive coupled to said corresponding disk-array;
  determining if said disk-array corresponding to said plurality of serial check sums read in said serial check sums reading step is recorded as one of said plurality of disk drives coupled to said interface; and
  recording said serial check sum corresponding to said disk drive in said plurality of serial check sums of said corresponding disk-array.

13. The disk drive managing method as in claim 12, wherein said array signature is a predetermined value.

14. The disk drive managing method as in claim 12, wherein said array signature is stored at a first position of said last sector.

15. The disk drive managing method as in claim 12, wherein said serial check sum of said corresponding disk drive is arranged in said plurality of serial check sums according to a location of said disk drive in said corresponding disk-array.

16. The disk drive managing method as in claim 15, wherein said serial check sum of said corresponding disk drive is obtained by a numeration on a model number, a serial number, and a firmware revision number of said disk drive.

17. The disk drive managing method as in claim 15, wherein each of said plurality of disk-arrays is identified by said plurality of serial check sums.

18. The disk drive managing method as in claim 12, further comprising the steps of:
  adding an array record for a new disk-array when said corresponding disk-array is not recorded as one of said plurality of disk-arrays; and
  assigning a new serial number for said new disk-array.

19. The disk drive managing method as in claim 12, further comprising the steps of:
  determining whether all disk drives in said plurality of disk-arrays have been detected; and
  recording integrity properties for each disk-array in said plurality of disk-arrays.

20. The disk drive managing method as in claim 19, further including the step of determining from said integrity property whether all disk drives recorded in said plurality of serial check sums of each disk drive of said corresponding disk-array have been detected and recorded.

* * * * *